United States Patent
Kocher et al.

(10) Patent No.: US 6,278,783 B1
(45) Date of Patent: Aug. 21, 2001

(54) DES AND OTHER CRYPTOGRAPHIC, PROCESSES WITH LEAK MINIMIZATION FOR SMARTCARDS AND OTHER CRYPTOSYSTEMS

(75) Inventors: Paul C. Kocher; Joshua M. Jaffe, both of San Francisco; Benjamin C. Jun, Palo Alto, all of CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

(21) Appl. No.: 09/324,798

(22) Filed: Jun. 3, 1999

Related U.S. Application Data (60) Provisional application No. 60/087,826, filed on Jun. 3, 1998.

(51) Int. Cl.[7] ............................... H04K 1/02; H04K 9/06; H04L 9/16
(52) U.S. Cl. ........................... 380/277; 380/2 C; 380/42; 713/340
(58) Field of Search .................................. 380/28, 46, 29, 380/277, 259, 42, 26 P; 713/181, 340

(56) References Cited

U.S. PATENT DOCUMENTS

| | | |
|---|---|---|
| 4,908,038 | 3/1990 | Matsumura et al. . |
| 5,297,207 | 3/1994 | Degele ................................... 380/46 |
| 5,401,950 | 3/1995 | Yoshida ................................ 235/487 |
| 5,727,063 | 3/1998 | Aiello et al. ............................ 380/46 |

(List continued on next page.)

OTHER PUBLICATIONS

Schneier, Bruce, "Applied Cryptography, Second Edition: Protocols, Algorithms, and Source Code in C," Oct. 18, 1995, pp. 390–392.*

Kocher, P. "Timing Attacks on Implementations of Diffie–Hellman, RSA, DSS and Other Systems." in: Koblitz, N., *Advances in Cryptology–Crypto '96* (Berlin, Springer, 1996), pp. 104–113.

"Security Requirements for Cryptographic Modules," Federal Information Processing Standards Publication (FIPS PUB) 140–1, U.S. Department of Commerce, National Institute of Standards and Technology, Jan. 1994.

RSA Data Security, RSAREF Cryptographic Toolkit Source Code, File R–Random.C, available fronftp://ftp.rsa.com.

Krawczyk, H. et al., "HMAC: Keyed–Hashing for Message Authentication," Network Working Group Request for Comments RFC 2104, Feb. 1997.

(List continued on next page.)

*Primary Examiner*—Tod Swann
*Assistant Examiner*—Justin T. Darrow
(74) *Attorney, Agent, or Firm*—Joseph Yang; Thomas R. Lane; Skadden Arps (57) ABSTRACT

Methods and apparatuses are disclosed for improving DES and other cryptographic protocols against external monitoring attacks by reducing the amount (and signal-to-noise ratio) of useful information leaked during processing. An improved DES implementation of the invention instead uses two 56-bit keys (K1 and K2) and two 64-bit plaintext messages (M1 and M2), each associated with a permutation (i.e., K1P, K2P and M1P, M2P) such that K1P {K1} XOR K2P {K2} equals the "standard" DES key K, and M1P {M1} XOR M2P {M2} equals the "standard" message. During operation of the device, the tables are preferably periodically updated, by introducing fresh entropy into the tables faster than information leaks out, so that attackers will not be able to obtain the table contents by analysis of measurements. The technique is implementable in cryptographic smartcards, tamper resistant chips, and secure processing systems of all kinds.

39 Claims, 2 Drawing Sheets

U.S. PATENT DOCUMENTS

| | | | |
|---|---|---|---|
| 5,778,074 | | 7/1998 | Garcken et al. ............... 380/37 |
| 5,812,669 | * | 6/1998 | Jenkins et al. ............... 380/25 |
| 5,835,599 | | 11/1998 | Buer ............... 380/29 |
| 5,838,795 | * | 11/1998 | Mittenthal ............... 380/28 |
| 6,041,412 | * | 3/2000 | Timson et al. ............... 713/200 |
| 6,049,613 | * | 4/2000 | Jakobsson ............... 380/47 |
| 6,064,724 | * | 5/2000 | Kelly ............... 379/92.04 |
| 6,064,740 | * | 5/2000 | Curiger et al. ............... 380/265 |
| 6,069,954 | * | 5/2000 | Moreau ............... 380/28 |

OTHER PUBLICATIONS

Ryan, J. "Blinds for Thermodynamic Cipher Attacks," unpublished material on the world wide web at http://wwwe.cybertrace.com/thrmatak.html Mar. 1996.

"Data Encryption Standard," Federal Information Processing Standards Publication (FIPS PUB) 46–2, U.S. Department of Commerce, National Institute of Standards and Technology, Dec. 30, 1993.

Biham, E. et al., "Differential Fault Analysis of Secret Key Cryptosystem" in: Kaliski, B., *Advances in Cryptology—Crypto 97*, (Berlin, Springer, 1997) 17$^{th}$ Annual International Cryptology Conference, Aug. 17–21, 1997, pp. 513–525.

Based on "Karn/Hoey/Outerbridge implementation (Khodes): File DESC.C from RSAREF—Data Encryption Standard routines for RSAREF".

* cited by examiner

DES AND OTHER CRYPTOGRAPHIC, PROCESSES WITH LEAK MINIMIZATION FOR SMARTCARDS AND OTHER CRYPTOSYSTEMS

This application claims the benefit of U.S. provisional patent application No. 60/087,826, filed on Jun. 3, 1998.

This application is related to co-pending U.S. patent application Ser. No. 09/224,682, filed on Dec. 31, 1998.

FIELD OF THE INVENTION

The method and apparatus of the invention relate generally to securing cryptographic systems against external attacks and, more specifically, to preventing attacks that involve the external monitoring of cryptographic operations.

BACKGROUND OF THE INVENTION

Cryptographic operations are used for a variety of processes such as data encryption and authentication. In a typical symmetric cryptographic process, a secret key is known to two or more participants, who use it to secure their communications. In systems using asymmetric (or public key) cryptography, one party typically performs operations using a secret key (e.g., the so-called private key), while the other performs complementary operations using only non-secret parameters (e.g., the so-called public key). In both symmetric and asymmetric cryptosystems, secret parameters must be kept confidential, since an attacker who compromises a key can decrypt communications, forge signatures, perform unauthorized transactions, impersonate users, or cause other problems.

Methods for managing keys securely using physically secure, well-shielded rooms are known in the background art and are widely used today. However, previously-known methods for protecting keys in low-cost cryptographic devices are often inadequate for many applications, such as those requiring a high degree of tamper resistance. Attacks such as reverse-engineering of ROM using microscopes, timing attack cryptanalysis (see, for example, P. Kocher, "Timing Attacks on Implementations of Diffie-Hellman, RSA, DSS, and Other Systems," *Advances in Cryptology— CRYPTO '96*, Springer-Verlag, pages 104–113), and error analysis (see, for example, E. Biham and A. Shamir, "Differential Fault Analysis of Secret Key Cryptosystems," *Advances in Cryptology— CRYPTO '97*, Springer-Verlag, 1997, pages 513–525) have been described for analyzing cryptosystems.

Ciphers and algorithms believed to be cryptographically secure are known in the background art. For example, protocols using triple DES (a cipher constructed using three applications of the Data Encryption Standard using different keys) can resist all feasible cryptanalytic attacks, provided that attackers only have access to the standard inputs to and outputs from the protocol. However, even a product using an extremely strong cipher such as triple DES can be insecure if the keys are not managed securely.

This document assumes a detailed understanding of the Data Encryption Standard (DES), which is defined in Federal Information Processing Standards Publication 46 and need not be described in detail here. Information on DES and other cryptographic algorithms can also be found in *Applied Cryptography* by Bruce Schneier (Wiley and Sons, Inc., 1996), in the *Handbook of Applied Cryptography* by Menezes et al. (CRC Press, Inc., 1997), or in other standard references as will be appreciated by those skilled in the art.

SUMMARY OF THE INVENTION

This invention describes processes in which secrets (e.g., keys and/or messages) are divided into separate portions, which are then separately mutated, while maintaining mathematical relationships between or among the portions that are used for performing secure cryptographic operations. In the update ("mutation") operation, key management devices introduce randomness or other unpredictability into their internal state. By changing the secret portions, information collected by attackers about them can be made obsolete. If information is invalidated faster than it can be collected by attackers, a system can be made secure.

The invention provides for improved implementations of the Data Encryption Standard (DES), as well as other cryptographic operations, that resist external monitoring attacks. Unlike traditional DES implementations, which perform a set of processing operations that depend only on the input key and the message, the invention involves additional random (or otherwise unpredictable) state information in the cryptographic processing. The random state information is mixed with the keys, plaintext messages, and intermediate quantities used during processing. Information leaked to attackers during cryptographic processing is correlated to the random information, and any correlation to secret information is partially or completely hidden. As a result, it is difficult or impossible for attackers to determine secret parameters through analysis of leaked information.

A detailed description of how the invention may be applied to the Data Encryption Standard is provided. State parameters that are normally encoded as ordinary binary values are blinded and their order masked using randomized permutation tables. While a traditional DES implementation would encode the input message M as a 64-bit value, an exemplary embodiment of the invention blinds M to produce a two-part value (M1, M2) such that M1 XOR M2 corresponds to the "normal" message. Additionally, the parameters M1 and M2 are encoded in random order, where permutations M1P and M2P are stored in memory to keep track of the current order of the bits in M1 and M2. Keys may be similarly stored in blinded, order-randomized form. M1P and M2P contain bit ordering information and do not represent message content. The message blinding technique of the invention ensures that neither M1 by itself nor M2 by itself is correlated to the message in any way. Consequently, the implementation can remain secure even if the complete value of any parameter is leaked to an attacker.

The standard DES algorithm involves three primary types of operations: permutations, S lookups, and bitwise XORs. In the exemplary embodiment, permutations of the message (M1, M2, M1P, M2P) are performed by manipulating M1P and M2P. Only the permutation arrays are manipulated; the parameter data bits in M1 and M2 do not need to be accessed or modified. Permutations (such as IP, PC1, E, P, and FP, which are defined as part of the standard DES algorithm definition) can thus be made safe against leakage. For XOR operations, halves of the input parameters are processed separately. For example, using the message notation above, the operation of computing the XOR of two values A and B encoded as (A1, A2, A1P, A2P) and (B1, B2, B1P, B2P) is computed by first finding the XOR of (A1, A1P) and (B1, B1P), then finding the XOR of (A2, A2P) and (B2, B2P). Note that because of the blinding, A1 and B1 by themselves are not correlated to the complete value of A or B. Order randomization is used to prevent attackers from obtaining information about A and B from correlations within and between observations of the two XOR operations. Finally, for the S table lookup operations, the S tables themselves are stored in the device's memory in blinded form, such that the S table inputs and outputs are blinded with random values. To perform an S operation, the inputs (e.g., A1, A2, A1P, A2P), the S table input blinding factor, and the S input table permutation are combined and used to index the S table itself. (The S tables are blinded and randomly permuted, and are re-shuffled periodically.) The S results are obtained in halves, which are separately processed through the P permutation and XORed onto the destination. Sixteen rounds are performed, ultimately yielding the final ciphertext. The ciphertext is produced in permuted, blinded form, which may be easily converted to the standard DES ciphertext.

Although the invention has been described in the context of permuting both keys and messages, each into two subparts, those skilled in the art will appreciate that either or both (as well as other secret quantities) could be permuted, into a plurality of parts greater than two. In addition, although the invention has been described with respect to DES, the invention can be applied to and adapted to other cryptographic symmetric algorithms, including without limitation Blowfish, SEAL, IDEA, SHA, RC5, TEA, and other cryptographic algorithms involving operations suitable for application of the techniques of this invention. In all such cases, including DES, the term "plaintext" as used herein shall be understood to refer to the quantity that is in plaintext form relative to whatever cryptographic protocol is being used (e.g., DES). Thus, a "plaintext" quantity could actually be encrypted using some other algorithm and still be within the meaning of plaintext relative to the cryptographic protocol under consideration.

DETAILED DESCRIPTION OF THE INVENTION

Reduction of Signal-to-Noise Ratios

To obtain a secret key from a cryptographic system (cryptosystem) that leaks information, an attacker can gather data by observing a series of operations, perform statistical analysis on the observations, and use the results to determine the key.

In a common situation, an attacker monitors a physical property, such as power consumption, of a secure token as it performs a cryptographic operation. The attacker collects a small amount of data related to the key each time the token is observed performing a cryptographic operation involving the key. The attacker increases the amount of information known about the key by collecting and statistically correlating (or combining) data from multiple observations of the token as it performs operations involving the key (or related key).

In the case of a cryptosystem which is leaking information, such observations may contain signal (i.e., information correlated usefully to the key). However, such observations also contain noise (i.e., information and error that hinder or are irrelevant to determination of the key). The quality of the information gained from these observations is characterized by a "signal to noise" (or S/N) ratio, which is a measure of the magnitude of the signal compared to the amount of noise.

The number of operations that the attacker must analyze to recover the key depends on the measurement and analysis techniques, but is generally inversely proportional to the square of the S/N ratio. The constant of proportionality also depends upon the amount of confidence the attacker requires. For example, a relatively low confidence level may be acceptable to an attacker willing to do an optimized brute force search using statistical information about key bit values. Decreasing the signal by a factor of 15 and increasing the amount of measurement noise by a factor of 20 will reduce the signal-to-noise ratio by a factor of 300. This will generally mean that an attacker will require roughly 90,000 times as many observations to extract the same amount of information about the key. An attack requiring 1,000 observations to recover a key before the S/N reduction would now require on the order of 90 million observations to gain the same level of confidence in the recovered key.

A principal objective of the invention is to make cryptosystems that are difficult to attack successfully, for example by increasing the number of observations required by an attacker to compromise a key. By reducing the available signal size and/or increasing the amount of error, noise, and uncertainty in attackers' measurements, a system designer can make the so-called work function (effort required) to break a system larger. Ideally, the number of samples required to gain any significant amount of useful key information should exceed the maximum number of transactions that can be performed using the key, exceed the number of transactions that can be performed by the device (e.g., before the key expires), or else be so large that monitoring attacks are of comparable or greater difficulty than brute force and other known attacks. For example, consider a system programmed to self-destruct after one million operations (well beyond the expected operational life of most smartcards). If attackers are limited to measurements with a signal-to-noise ratio (across an entire transaction) well below 1/1000, the attacker would be unable to collect enough measurements to compromise the device.

For physically large systems, effective physical shielding, physical isolation, and careful filtering of inputs and outputs are known in the background art (e.g., U.S. government Tempest specifications). Such shielding techniques can protect cryptographic devices from external monitoring attacks that involve analyzing power consumption, electromagnetic radiation (both in air and coupled to the device's inputs and outputs), electrical activity within the device, etc. as well as protecting against physical attacks. Unfortunately, these techniques are difficult to apply in constrained engineering environments. For example, physical constraints (such as size and weight), cost requirements, and the need to conserve power can often prevent the use of previously-known shielding techniques.

Leak-Minimizing DES: Introduction

The Data Encryption Standard (DES) is widely used as a cryptographic primitive for data encryption, pseudorandom number generation, MACs, and other cryptographic operations. The basic DES encryption algorithm uses a 56-bit key to transform a 64-bit plaintext block into a 64-bit ciphertext block. The corresponding decryption operation uses the same key to transform ciphertext blocks into their corresponding plaintexts. This discussion will assume the reader has a detailed understanding of the well-known DES algorithm, which need not be discussed in detail here. For more information about DES (and other cryptographic algorithms), see *Applied Cryptography* by Bruce Schneier or the *Handbook of Applied Cryptography* by Menezes et al.

The DES implementation of the invention incorporates one or more novel features (as will be described below in an exemplary embodiment of the invention) to provide resistance to external monitoring attacks. The invention may be used to address various sources of information leakage such as, without limitation:

(a) Permutations (such as the key permutation PC1) can leak the key bits by having different characteristics when "0" and "1" bits are permuted. In an extreme example, if conditional jumps are performed depending on the values of key bits, observation of the microprocessor's power consumption can reveal whether the jumps are taken. Thus, analysis of measurements from permutation operations can reveal the secret key.

(b) The standard DES C and D registers are each 28 bits long and must be rotated once or twice in each round. These 28 bit long quantities do not fit exactly in standard 8, 16, or 32-bit microprocessor registers. Consequently, bits that rotate off the end of each microprocessor register must be carried to the next register. Observation of the power consumption and/or timing can reveal whether the carried bits in each round equal zero or one, revealing some or all of the key bits.

(c) Data manipulation operations reveal information about the data being processed. For example, the power consumption of a typical operation (whether in a microprocessor or gate-level hardware implementation of DES) is correlated to the data being manipulated. For example, shifting a byte with a Hamming weight of 5 will take a significantly different amount of power than shifting a byte of Hamming weight 4. Another example: power consumption is correlated to values on the address bus (such as addresses of bytes fetched for S table lookups), revealing information about the internal processing of the DES algorithm. An attacker can verify guesses about key bits by checking whether expected biases or effects appear in collected data.

(d) Table lookup operations leak information about the address of the memory lookup and the value that is returned. Particularly serious sources of such leakage include the device's power consumption and electromagnetic radiation. Signals radiated from the address and data bus lines connecting a device to the memory containing the table (e.g., ROM or RAM) can be detected and analyzed to gain information about the DES outputs, which in turn can compromise the keys. Similarly, power consumption analysis can reveal information about the S lookups.

(e) Operations that change the device state (including the memory contents, processor flags, registers, etc.) can reveal information about the initial and final states of the operation. For example, the power consumption characteristics may be distinguishable for a register bit holding a zero value, a register bit holding a one value, a register changing from zero to one, and a register changing from one to zero. Note that devices with parallel redundant independent computational units with inverted logic can still leak information by their state transitions even though the total number of zero and one bits in the device's state remains constant.

(f) Variations between individual transistors in an integrated circuit, variations in the electrical properties of wires within a chip, variations in the amount of electromagnetic radiation emitted by different wires, etc. can all provide variations detectable by an attacker that can be analyzed statistically to determine secret keys.

Note that multiple observations are often required to determine keys or otherwise break the system. (It is not always necessary to find the key to break a system. For example, determining a message's plaintext can be as useful as finding the key, and the attacks may be used to do this.) As mentioned previously, statistical analysis may be used to extract useful signals from measurements. For example, a computer can digitally filter a signal to average out noise, identify frequency components of interest, etc. Analog filtering techniques may also be used (such as using a high-pass and/or low-pass filters, tuners, etc. to isolate signals of interest).

The exemplary leak-minimized DES implementation of the invention addresses these and other weaknesses via a number of security-enhancing techniques that, although used together in the exemplary embodiment, may be deployed individually or in various combinations, as will be appreciated by those skilled in the art. The implementation will be fully described below with regard to encryption only. However, those skilled in the art will readily appreciate how to apply the principles demonstrated here to decryption operations because encryption and decryption are extremely similar and use the same Feistel "F" function. For the convenience of the reader, certain differences between the two implementations will be noted where they are significant. Finally, those skilled in the art will also appreciate that the techniques demonstrated here can also be applied to combined encryption/decryption DES functions.

In one embodiment of the invention, the inputs to the DES function (the plaintext and the key, when encrypting) are encoded in a different form than usual. Standard DES implementations use a 56-bit key K (commonly stored as 8 bytes with an ignored parity bit in each byte) and a 64-bit plaintext message M. However, the process of loading a key or message into a standard DES implementation can leak information about the key or plaintext.

Thus, a preferred improved DES implementation of the invention instead uses two 56-bit keys (K1 and K2) and two 64-bit plaintext messages (M1 and M2), each associated with a permutation (i.e., K1P, K2P, M1P, M2P) such that K1P{K1} XOR K2P{K2} equals the "standard" DES key K, and the M1P{M1} XOR M2P{M2} equals the "standard" plaintext. In the notation used above and throughout this document, "X{Y}" denotes the result of applying permutation X to Y; "X[Y]" denotes element Y of array X; and "X[Y][Z]" denotes element Y,Z of the two-dimensional array X.

In this embodiment, the permutations and blinded values can be produced as follows. To produce K1 and K2 from a 56-bit key K, a random value K1 is produced, then K2 is computed as K2=K XOR K1. (As used herein, the term "random" shall include truly random values, as well as pseudorandom and other values that are unpredictable by an attacker. Methods for producing random values are well known in the background art and need not be described in detail here.) Next, random permutations K1P and K2P are produced, and K1P-inverse is applied to K1 and K2P-inverse is applied to K2. Similarly, to divide a message M into M1 and M2, M1 is set to equal a 64-bit random value, then M2 is set to M2=M XOR M1. Next, random permutations M1P and M2P are created and their inverses are applied to M1 and M2, respectively. The permuted keys and messages are then used, rather than the standard key and message, during the course of cryptographic operations. Although not necessary to the present invention, the exemplary embodiment has the properties that: (a) for any key, H(K1) and H(K2) average to 64/2=32, where H(X) is the Hamming Weight of X, (b) the probability that any specific bit in either K1 or K2 is a 1 is 0.5, and (c) correlations between register locations and key bits are weak (or equal to exactly 0.5). These properties can reduce the amount of useful information leaked by the system to an attacker.

At the end of such operations, the two parts of the ciphertext may be recombined to form the same encrypted/decrypted quantity that would have been produced by a standard DES protocol.

For ephemeral keys and messages (i.e., those only used for a small, limited number of operations), the splitting may be simply performed when the key or message is used. However, for long-term keys used for a large number of operations, it is preferable to store keys in split form to ensure that splitting operations will not reveal information about the keys. (The exemplary embodiments described may be used in either case.)

The leak-minimizing DES implementation must be initialized before it can be used. Such initialization can occur at any time before the leak minimizing cryptographic operations are used, including, without limitation, when the device is manufactured, personalized, installed, activated, downloaded, first used, keyed, etc.

Leak-Minimizing DES: Initialization and S Updates

Initialization provides starting values for the permutations, S tables, and associated parameters. The following parameters are initialized, in no particular order (i.e., one order is shown for convenience, but the actual order of initialization does not matter):

(a) Define S_ORDER_TABLE[0 . . . 7] to contain 0 . . . 7 in random order. (Certain implementations may elect to use the high-order bits in S_ORDER_TABLE for Hamming Weight equalization, e.g. by storing 0x70, 0x61, 0x52, 0x43, 0x34, 0x25, 0x16, 0x07 in the table. However, if this is done, accesses to S_ORDER_TABLE should discard the high-order bits. One of skill in the art will appreciate that similar balancing may be applied to other tables and operations as well.)

(b) Create S_INPUT_MASK[0 . . . 7] as a table containing 8 random 6-bit entries (i.e., with values in the range 0 . . . 63), one for each S table, in the order specified by S_ORDER_TABLE.

(c) Create a random S_INPUT_PERM[0 . . . 7][0 . . . 5] where each of the eight S_INPUT_PERM arrays contains 0 . . . 5 in random order.

(d) Create a random S_OUTPUT_ORDER[0 . . . 7][0 . . . 7], where each of the eight S_OUTPUT_ORDER arrays contains 0 . . . 3 in random order in its first 4 elements and 0 . . . 3 in random order in its second 4 elements.

(e) Create a random 32-bit S_OUTPUT_MASK. The 32 bits of S_OUTPUT_MASK are used to blind and unblind the S table outputs. (In this exemplary embodiment, each of the S tables uses 4 blinding bits.) As will be described in (f), the value of S_OUTPUT_MASK is used to produce the blinded S tables.

(f) Create S_TABLE[0 . . . 7][0 . . . 63] such that S_TABLE[i][j] is computed using standard DES S table t (where t is between 1 and 8 inclusive) as follows: Let i=S_ORDER_TABLE[t-1]. Let w=S_INPUT_PERM[i]{j} XOR S_INPUT_MASK [i]. Let x equal the result of looking up w in the DES S table t (where the lookup process includes using bits 0 and 5 of w to select a permutation within the table and bits 1 . . . 4 to select the offset within the permutation as defined in the DES specification). Let y equal x XORed with the 4 bits of S_OUTPUT_MASK that correspond to the output of S table t (selected by applying the inverse of the P permutation to S_OUTPUT_MASK then taking bits 4t through (4t+3) in the result). Next, compute an 8-bit value z that equals y XORed with 17 times a random 4-bit value. Finally, set S_TABLE[i][j]=S_OUTPUT_ORDER[i]{z}.

While it is preferable that each device be initialized with unique random parameters (S_TABLE, etc.), cost constraints or other considerations may sometimes make it necessary to initialize multiple devices identically. Similarly, if multiple devices share a key, it is preferable (but not required) that the key be initialized in each with a unique set of key parameters (K1, K2, K1P, K2P).

For greater security, during operation of the device the tables are preferably periodically updated so that attackers will not be able to obtain the table contents by analysis of measurements. The updating process should preferably introduce fresh entropy into the tables faster than information leaks out. Such an update process can require a significant amount of time, particularly if the S tables are stored in memory such as some EEPROM that is slow to update. To prevent the update process from introducing unpredictable processing delays, the update can occur gradually, so that a portion of the S table is updated at a time. Idle time, if available, can also be used for table updates.

One way to implement the update process is to have each of the main arrays (S_INPUT_MASK, S_INPUT_PERM, S_OUTPUT_ORDER, and S_TABLE) contain 9 elements (one more than the required eight), such that an extra element is always available for preparing new (updated) tables. The table update process transforms any one of the 8 active parameter sets, places the result into free array entries, then updates S_ORDER_TABLE and S_OUTPUT_MASK when the updated tables are ready to use. To update an S table block, an input index (m) and an output index (n) are selected, where m is an index to the existing entry to be updated in each of the arrays and n is an index to the free array entries where the updated values will be placed. The device creates and stores new values for the parameters at S_INPUT_MASK[n], S_INPUT_PERM[n][0 . . . 5], S_OUTPUT_ORDER[n][0 . . 7], and S_OUTPUT_MASK. (The new S_OUTPUT_MASK has new random bits in the position corresponding to S_ORDER_TABLE[m], but the other bits are not changed.) Next, the device translates the S_TABLE[m][0 . . . 63] into S_TABLE[n][0 . . . 63], compensating for the old parameter set (S_INPUT_MASK [m], S_INPUT_PERM[m][0 . . . 5], S_OUTPUT_ORDER[m][0 . . . 7], and S_OUTPUT_MASK) and incorporating the changes appropriate for the new parameter set (S_INPUT_MASK[n], S_INPUT_PERM[n][0 . . . 5], S_OUTPUT_ORDER[n][0 . . . 7], and the new S_OUTPUT_MASK). Alternatively, if a copy of the standard (non-blinded, etc.) S table is available, its values may be used to perform the update, in which case the old parameter set is not required for the update. Once the new S_TABLE is complete, S_ORDER_TABLE is updated by replacing the value m with the value n. Also, S_OUTPUT_MASK is replaced with its new value. Although not strictly required, the update to S_ORDER_TABLE and to S_OUTPUT_MASK is preferably done as a single reliable memory update, since update of only one could cause incorrect operation. If unreliable memory updates are used during other memory updates, the new table should be checked against the old one for correctness. Additionally, a test operation can be performed using a test key to verify correct operation before important keys are used with the implementation. Alternatively or additionally, complete and error-free write operations may be used for table update operations, although these memory updates are typically much slower than standard unverified memory updates.

Leak-Minimizing DES: Encryption (and Decryption)

Figure 1:
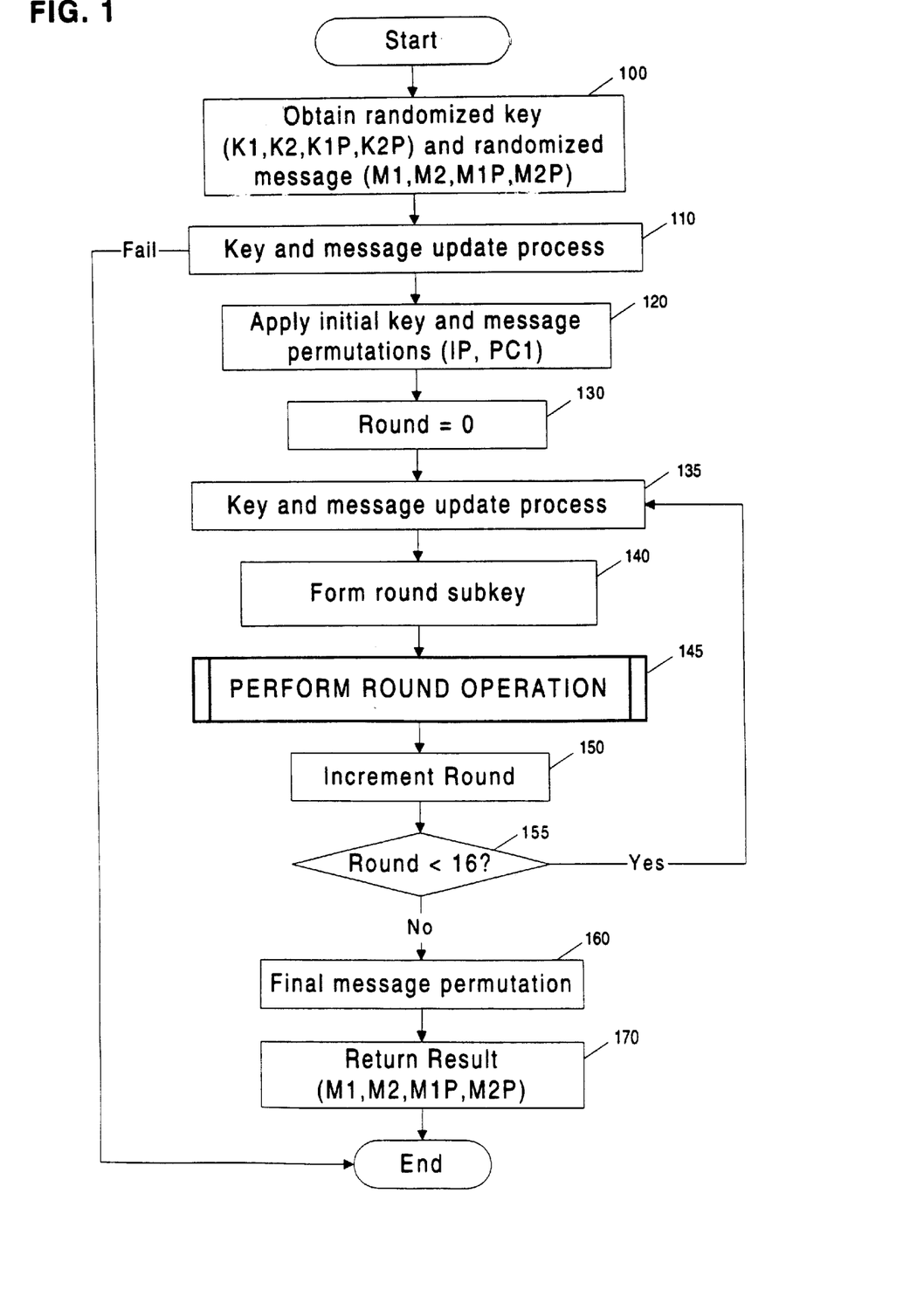
FIG. 1 shows an exemplary embodiment of a leak-minimized DES method.

A traditional DES encryption process uses a key K to transform a 64-bit input message M into a result. FIG. 1 shows an exemplary DES encryption process of the invention. At step 100, a transformed input message is obtained or prepared as two 64-bit data messages (M1 and M2) each with an order permutation (M1P and M2P), such that M=M1P{M1} XOR M2P{M2}. Also at step 100, a transformed key is obtained, similarly encoded as K1, K2, K1P, and K2P. If the message and key are not available in this form, they are converted thereto. For example, to transform the message M, the device obtains a random 64-bit value R, computes M1=M XOR R and M2=R, creates randomized permutations M1P and M2P, and permutes M1 and M2 according to the inverses of M1P and M2P (i.e., replaces M1 and M2 with M1P_Inverse{M1} and M2P_Inverse{M2}, respectively). A similar transformation can be applied to the key K. This process can be performed at any time before the results are required (e.g., in advance, at the beginning of the DES operation, at (or instead of) step 110 or 120 below, etc.). (The foregoing encoding is described for exemplary purposes only; one of ordinary skill in the art will appreciate that many alternate encodings are possible and may be used. For example, more than two sub-parts could be used, and other functions besides XOR could be used. Such variations will be appreciated by those skilled in the art in light of the exemplary embodiment of the invention described herein.)

At step 110, key and message update processes are performed. At the beginning of the update process, a failure counter C is incremented and checked against a threshold value. If the threshold is reached, the operation fails and terminates. Otherwise, the input parameters for the key (K1, K2, K1P, K2P) and message (M1, M2, M1P, M2P) are updated. The update process consists of two basic operations: reordering and randomizing. Reordering updates the positions of data bit and permutation entries. Exchanging pairs of elements in K1P (or K2P) and the complementary pair of bits in K1 (or K2) does not change the effective value of the message but does reorder its encoding. Randomizing blinds the data bit values, in this embodiment through an XOR operation. XORing the same random Boolean value onto a bit of K1 and the corresponding bit of K2 also does not have any effect on the value of K1P{K1} XOR K2P{K2}. To avoid correlation attacks, an XOR table is constructed with the value to XOR, permuted with K1P and K2P, and finally separately applied to K1 and K2. If the key is to be used in future transactions, the input parameters for the key are overwritten in the long-term memory with the updated values (using a complete and error-free write operation). As noted, the input parameters for the message (M1, M2, M1P, M2P) may be reordered and randomized in a similar fashion as for the key. Finally, the failure counter C is set to zero. At this point, the key and message have been successfully randomized, so attackers cannot force the device to process the same key repeatedly by introducing power failures or other processing interruptions.

At step 120, the initial permutation (IP), which is a part of the standard DES algorithm, is applied to the input message. Because M1 and M2 are stored in permuted form, the initial permutation needs to affect the value of M1P{M1} and M2P{M2}. Although it is possible for an implementation to modify the data (i.e., M1 and M2), it is not necessary. The permutation operation can be applied by manipulating only the permutation tables themselves, by applying the IP to the permutations M1P and M2P, e.g. by computing a new M1P=IP{M1P} and a new M2P=IP{M2P}. Optionally, additional reordering or randomizing of the data (as was performed at step 110) may be performed as well.

Also at step 120, the PC1 permutation, which is a part of the standard DES algorithm, is applied to the input key. As with the IP, the permutation operation can be applied by manipulating only the permutation tables themselves (K1P and K2P) and do not necessarily need to involve the data. Note that as a performance optimization, keys that will be used often may be stored with this permutation already applied. To improve performance, PC2 can also be applied at this step to simplify the permutation operation required in each round by enabling the combining of PC2 with the shift operations. (The remaining 8 unused key bits are stored to the right of the 48 output bits of PC2 to maintain the 56 bit key length.) Optionally, additional reordering or randomizing of the key (as was performed at step 110) can be performed.

At step 130, the round counter is initialized to zero. At step 135, the key and message parameters are updated, as in step 110.

At step 140, the round key is prepared by permuting the key (K1, K2, K1P, K2P) to separate the 6 key bits required for each of the 8 S operations. If the PC1 step above is optimized, this step combines the round key left rotates (or right key rotates when decrypting) and PC2 operation in a single 56-to-56 permutation. The complete permutation performed is equivalent to performing PC2 inverse, followed by the round rotate operation, followed by a PC2 forward permutation. As noted previously, the encoding for the round subkey places the 48 key bits used in the round operation at the left of the key register, and places the remaining 8 (unused) key bits at the right. The number of shifts is a function of the round: rounds 0, 1, 8, and 15—or 1, 2, 9, and 16 if numbering with round 1 as the first round—have one shift; the others have two. Thus, a different permutation operation or an extra permutation operation is used in rounds with two shifts. Optionally, additional reordering or randomizing of the key may be performed at this step. (If decrypting, this step can be performed after the S table lookups, or the PC1 permutation step will need to be adjusted to compensate for applying this permutation before the S lookups. Also, as noted, the PC2/rotate key permutation needs to incorporate a rotate to the right.)

Figure 2:
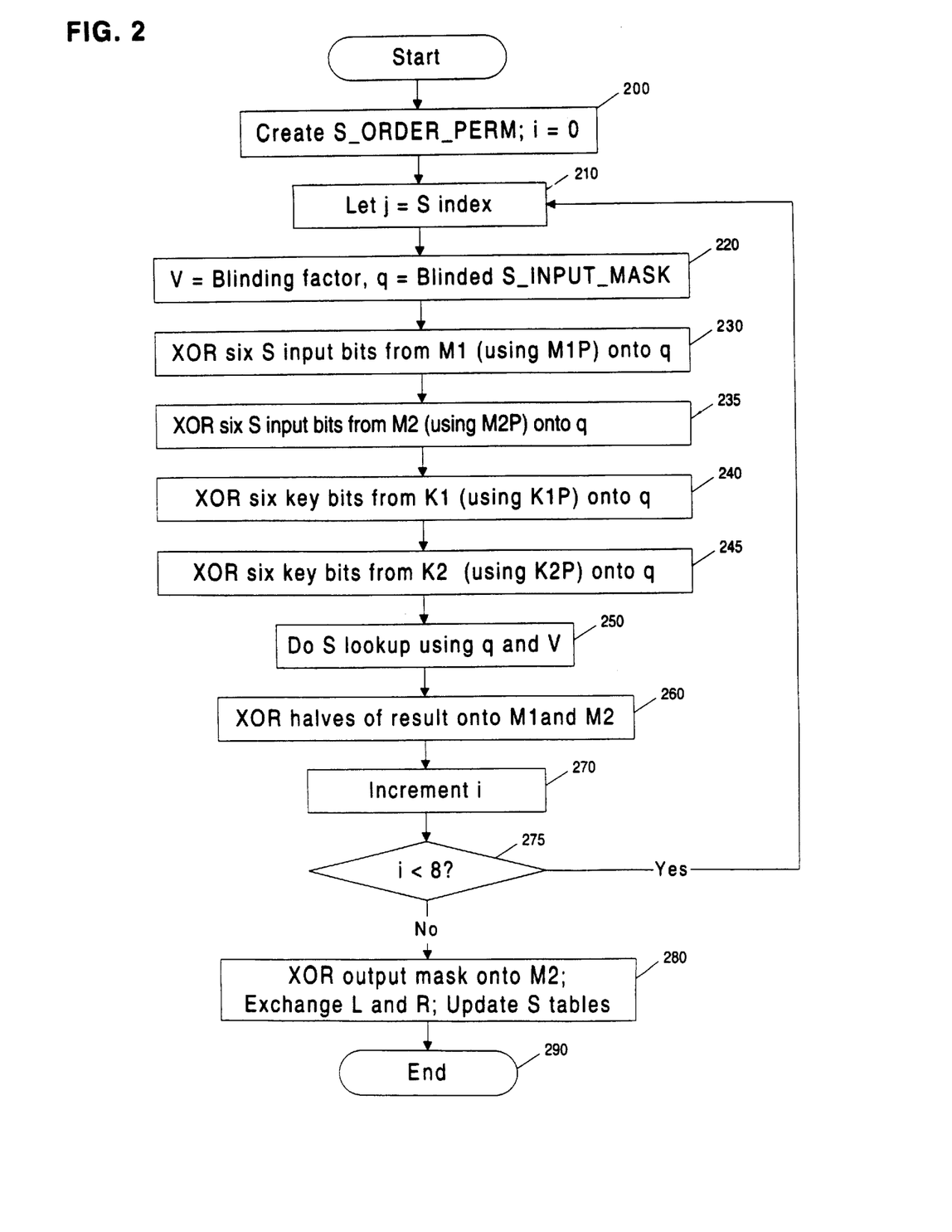
FIG. 2 details the S table lookups in each round of the leak-minimized DES method of FIG. 1

At step 145, the round operations are performed, as detailed in FIG. 2. Referring to FIG. 2, at step 200, the device produces a random S_ORDER_PERM[0 . . . 7] containing 8 elements with the values 0 . . . 7 in random order. Also, the loop counter i is initialized to zero. At step 210, j is set to the S table index for the next S lookup operation (e.g., j=S_ORDER_TABLE[S_ORDER_PERM[i]]).

At step 220, a random 6-bit mask V is obtained. Also at step 220, index register q is computed as the current S_INPUT_MASK value blinded by V (e.g., by computing q=V XOR S_INPUT_MASK[j]).

At step 230, using the permutation M1P for bit selection, the six input bits from M1 corresponding to the current S operation are extracted and XORed onto q. The six bit extraction and XOR operations are performed in random order. The selected bits correspond to the group of six bits selected by the E expansion operation for the current S index. Bits are placed in q in the order specified by S_INPUT_PERM[j]. Step 235 is similar to step 230, except that the appropriate six bits of M2 are selected using M2P.

At step 240, using the permutation K1P for bit selection, the six key bits input into the S operation are selected from K1. The six bit extraction and XOR operations are performed in random order. The selected bits correspond to the six key bits used in the current S operation of the current round. (If the key permutations performed previously at steps 120 and 140 of FIG. 1 place the round's PC2 permutation results as adjacent bits in M1P, then j is used as an index to the appropriate block of six bits in K1P.) Bits are placed in q in the order specified by S_INPUT_PERM[j]. Step 245 is similar to step 240, except that the appropriate six bits of K2 are selected using K2P.

At step 250, the S table lookup is performed by retrieving S_TABLE[j][q XOR V]. At step 260, for each of the 4 bits in the left half of the S table result, the device identifies the target location in M1 corresponding to the result of performing the S result permutation, the P permutation, and the M1P permutation. Each of the left 4 S result bits is permuted according to the first half of the elements in S_OUTPUT_ORDER[j] and XORed onto the corresponding M1 bit. (These permutations ultimately target the bit in M1 that corresponds to the appropriate destination bit in L.) The same is done to XOR the 4 bits in the right half of the S result onto M2 using M2P and the second half of S_OUTPUT_ORDER[j]. Optionally, the S table entry may be updated by XORing the left and right halves of the S table entry with a random 4-bit constant, permuted according to the inverse of the S_OUTPUT_ORDER permutations for the left and right half of the S result.

At step 270, the loop counter i is incremented. At step 275, i is checked to determine whether more of the round's 8 S table lookups need to be performed. If so, processing continues at step 210.

After the S table lookups have completed, at step 280 the value of S_OUTPUT_MASK is XORed onto M2 (of course, adjusted according to M2P). Also at step 280, the right and left halves of the data are exchanged in M1, M1P. Note that the exchange may be implemented as a bit permutation which, as described previously, can be accomplished by only changing M1P. Similarly, the left and right halves of M2, M2P are exchanged. Additional reordering or randomizing of the message, for example as described at step 110 of FIG. 1, is recommended at this point. Finally, updates to the S_TABLE are performed, as was described in the previous section, "Leak-Minimizing DES: Initialization and S Updates". At step 290, the process of FIG. 2 completes.

Referring back to FIG. 1, at step 150, the round counter is incremented. At step 155, the round counter value is checked to determine whether all 16 rounds have been completed. If rounds remain, processing continues at step 135.

After all rounds are complete, the final permutation is performed on the message at step 160. As described previously, the permutation operation can be applied by only manipulating the permutation tables themselves (M1P and M2P) and do not necessarily need to involve the data. Optionally, additional reordering or randomizing of the data may be performed. Finally, at step 170, the result contained in (M1, M2, M1P, M2P) is returned. If the result is non-secret (e.g., ciphertext), the standard DES ciphertext is produced by computing M1 P{M1} XOR M2P{M2}.

During or between encryption (and decryption) operations, the S tables and associated parameters are updated. The rate and frequency at which updates are performed is a design parameter that depends on several factors. For example, table updates take time, particularly if the device's memory updates are slow, so less frequent table updates may be desirable for some high-performance implementations. The lifetime of the device's memory may also require that the update rate be limited. For example, EEPROM memories may fail if they are updated too many times. Also, devices with higher leakage rates may need to have their tables updated more often. For example, by using multiple redundant tables or splitting operands into more than two parts, effective leakage rates are reduced, and the table update rates can decrease. Finally, the device's security requirements can dictate the update frequency (e.g., more frequent updates can make attacks more difficult).

Because the DES key length is quite short (only 56 bits), DES is often strengthened using the triple DES construction, whereby three DES operations are performed on each data block. Leak minimizing triple DES may be implemented using three iterations of leak-minimizing single DES. Note that the two components comprising the first DES output may be used directly as the input to the second DES operation, and the second DES output components may be used directly as the input to the third DES operation. Also, the final permutation on the first and second DES operations is unnecessary if the initial permutation is omitted on the second and third DES operations.

Another alternate construction, DES-X, is known in the background art and is occasionally used as a way to strengthen DES against brute force attacks. DES-X involves XORing the plaintext with a 64-bit secret value (KX), using the normal DES algorithm with a secret DES key (KY) to encrypt the XOR result, and XORing the DES result with a third secret value (KZ). In an exemplary embodiment of DES-X according to the present invention, the XOR secrets (KX and KZ) can, for example, be stored as two components each (KX1, KX2 and KZ1, KZ2). Before the DES operation, KX1 is XORed onto one of the message halves (e.g., M1 with permutation through MP1) and KX2 onto the other. The DES operation is performed using a leak-minimizing implementation. After the DES operation, the message result halves are XORed with KZ1 and KZ2. To update a pair of XOR secret components (KX1 and KX2, or KZ1 and KZ2), a random number is produced and XORed onto both. Like other keys and messages, XOR key components can optionally have associated permutations.

Other Considerations

Cryptographic operations should normally be checked to ensure that incorrect computations do not compromise keys or enable other attacks. Cryptographic implementations of the present invention can be, and in a preferred embodiment of the invention are, combined with error-detection and/or error-correction logic to ensure that cryptographic operations are performed correctly. For example, a simple and effective technique is to perform cryptographic operations twice, ideally using two independent hardware processors and implementations, with a comparator to verify that both produce identical results. If the results produced by the two units do not match, the comparator will prevent the defective processing result from being used. In situations where security is more important than reliability, the comparator may make the device self-destruct if serious errors occur. For example, the comparator can cause a self-destruct if the two defective DES operations occur sequentially or once five defective DES results occur during the lifetime of the device. In some cryptosystems, redundancy is not necessary. For example, with RSA, self-checking functions can be incorporated into the cryptosystem implementation itself or verification can be performed after the operations.

Self-diagnostic functions such as a POST (power-on-self-test) should also be incorporated to verify that cryptographic functions have not been damaged. In some smartcards and other devices, the ATR (answer-to-reset) must be provided before a comprehensive self-test can be completed. In such cases, the self-test can be deferred until after completion of the first transaction or until a sufficient idle period. For example, a flag indicating successful POST completion can be cleared upon initialization. While the card is waiting for a command from the host system, it can attempt the POST. Any I/O received during the POST will cause an interrupt, which will cancel the POST (leaving the POST-completed flag at zero). If any cryptographic function is called, the device will check the POST flag and (if it is not set) perform the POST first.

Conclusions

Many variations and adaptations of the invention are possible. For example, the message bits can be stored in 128-bit arrays where the bits are intermingled (as opposed to having separated halves), keys can be manipulated in 64-bit form instead of 56-bit form, orderings can be reversed or permuted (including in ways that do not change the final result of the computation). Rather than blinding operations with XOR halves, other bit operations can be applied. Where basic operations other than XOR bit operations are used, other splitting and/or blinding functions can be used. To save memory, permutation tables can be eliminated while maintaining randomness in table orders by encoding tables such that XORing with a mask (or applying another index unmasking function) yields the final pointer to the data. Rather than splitting data into only two halves, three or more subvalues can be used. Additional tables (whose inputs serve as pointers to further tables, or whose outputs are combined, or both) can be used for additional security. In optimized hardware implementations, it might be necessary to limit the amount of system state information, so simplified versions of the algorithm can be implemented. For example, rather than maintaining full permutation tables, it is possible to permute the order by applying a parameter-based function to the input. For example, in an exemplary permutation operation, the output bit location is found by XORing the input location register by a first constant, then adding the value of a second constant. (For a 6-bit index, only 12 register bits are required to encode the permutation, as opposed to $(2^6)(64)=4096$ for a regular permutation.) In hardware implementations where individual operations in an integrated circuit or other module are considered to be secure, the invention may still be applied for securing secret messages and keys communicated between the circuit (or module) and other parts of the system.

Further, although the invention has been described in the context of permuting both keys and messages, each into two sub-parts, those skilled in the art will appreciate that either or both (as well as other secret quantities) could be permuted, into a plurality of parts greater than two. Finally, although the invention has been described with respect to DES, the invention can be applied to and adapted to other cryptographic symmetric algorithms, including without limitation Blowfish, SEAL, IDEA, SHA, RC5, TEA, and other cryptographic algorithms involving operations suitable for application of the techniques of this invention. In all such cases, including DES, the term "plaintext" as used herein shall be understood to refer to the quantity that is in plaintext form relative to whatever cryptographic protocol is being used (e.g., DES). Thus, a "plaintext" quantity could actually be encrypted using some other algorithm and still be within the meaning of plaintext relative to the cryptographic protocol under consideration.

The invention therefore encompasses a wide variety of related techniques that enable the construction of devices that are significantly more resistant to attack than devices of similar cost and complexity that do not use the invention. In addition, multiple security techniques may be required to make a system secure; and leak minimization may be used in conjunction with other security methods or countermeasures.

As those skilled in the art will appreciate, the techniques described above are not limited to particular host environments or form factors. Rather, they may be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. A method for performing a cryptographic operation on a message, comprising:
   (a) generating initial unpredictable information;
   (b) using said initial unpredictable information, transforming an initial secret quantity into a plurality of randomized quantities having a predetermined logical relationship thereamong; and
   (c) performing a first step of said operation involving said randomized quantities in a hardware device to reduce the amount of useful information about said operation available from external monitoring of said hardware device.

2. The method of claim 1 wherein said initial unpredictable information includes a plurality of random values obtained from a random number generator.

3. The method of claim 1 wherein said initial secret quantity includes at least one of the group of secret quantities comprising a message and a key.

4. The method of claim 1 wherein step (b) includes a blinding operation.

5. The method of claim 4 wherein said blinding operation includes an XOR operation.

6. The method of claim 1 wherein the probability that the value of any specific bit in any of said randomized quantities is a "one" is one half (0.5).

7. The method of claim 1 wherein step (c) includes separately operating on a plurality of said randomized quantities in a random order.

8. The method of claim 1 wherein said cryptographic operation is compatible with the Data Encryption Standard (DES), said method further comprising recombining the result of step (c) to produce a final result, said final result being a cryptographic representation of said message transformed with said DES algorithm.

9. The method of claim 8 further comprising using said intial unpredictable information to shuffle the substitution tables (S tables) characteristic of said DES algorithm.

10. The method of claim 9 wherein said step of using said initial unpredictable information to shuffle said S tables includes blinding the outputs of said S tables.

11. The method of claim 9 wherein said step of using said initial unpredictable information to shuffle said S tables includes permuting said S tables.

12. The method of claim 9 wherein step (c) includes extracting, in random order, data representing the six-bit inputs to the S tables in randomized form from said randomized quantities.

13. The method of claim 1 further comprising:
   (d) updating at least one of said randomized quantities using additional unpredictable information to generate at least one updated randomized quantity; and
   (e) performing a second step of said operation involving said at least one updated randomized quantity.

14. The method of claim 13 wherein step (d) includes reordering the bit positions of said at least one randomized quantity.

15. The method of claim 13 wherein step (d) includes randomizing the bit values of said at least one randomized quantity.

16. The method of claim 13 wherein step (d) includes incrementing and checking a failure counter prior to said updating, and clearing said failure counter following said updating.

17. The method of claim 13 wherein step (c) includes performing said first step of said operation using a plurality of parameters, said method further comprises using said initial unpredictable information to initialize said parameters and updating said parameters to generate a plurality of updated parameters, and step (e) includes performing said second step of said operation using said updated parameters.

18. A method for performing a cryptographic operation on a message using a key, comprising:
   (a) using unpredictable information, transforming said message into a plurality of message portions having a predetermined logical relationship thereamong;
   (b) using unpredictable information, transforming said key into a plurality of key portions having a predetermined logical relationship thereamong;
   (c) performing a first step of said cryptographic operation on said message portions using said key portions in a hardware device to reduce the amount of useful information about said operation available from external monitoring of said hardware device;
   (d) updating at least one of said plurality of message portions with unpredictable information;
   (e) updating at least one of said plurality of key portions with unpredictable information;
   (f) performing at least a second step of said cryptographic operation on said message portions using said key portions in a hardware device to reduce the amount of useful information about said operation available from external monitoring of said hardware device; and
   (g) returning a cryptographic result.

19. The method of claim 18 wherein said cryptographic operation is compatible with the Data Encryption Standard (DES) such that said result is a representation of the value derived by applying the DES algorithm to said message.

20. The method of claim 18 further comprising a step of using unpredictable information to shuffle the substitution tables (S tables) charateristic of the Data Encryption Standard (DES) between step (c) and step (f).

21. The method of claim 18 wherein said step (b) establishes a predefined mathematical relationship between said key portions and said secret quantity which is preserved when said key portions are updated at step (e).

22. A cryptographic processing device for performing a cryptographic operation in a manner resistant to discovery of a secret quantity by external monitoring, comprising:
   (a) an untrusted input for electrical power, from which the device's power consumption can be measured;
   (b) a secure memory containing at least a representation of said secret quantity;
   (c) a source of unpredictable information for transforming said secret quantity into a plurality of randomized quantities having a predetermined logical relationship thereamong;
   (d) an input/output interface;
   (e) a processor connected to said memory, configured to perform cryptographic transformations on randomized forms of data received via said interface using randomized forms of said secret quantity.

23. The device of claim 22 wherein said device comprises a smartcard.

24. The device of claim 22 wherein said power consumption varies measurably during said cryptographic transformations, but where measurements of said power consumption are not correlated to said secret quantity.

25. The device of claim 22 wherein said source of unpredictable information comprises a random number generator.

26. The device of claim 22 further comprising at least one register for temporarily storing said randomized quantities, wherein the correlation between any single bit of said at least one register and said secret quantity is undetectably small, but where the correlation between a combination of multiple bits of said at least one register and said secret quantity is measurably significant.

27. The device of claim 26 wherein said device is a smartcard.

28. A method for performing a symmetric cryptograhic operation using a secret key with resistance to external monitoring attacks, comprising:
   (a) obtaining an input message;
   (b) generating initial unpredictable information;
   (c) combining said key, said message, and said unpredictable information;
   (d) deriving a result, where:
      (i) said result is a predefined function of said input message and of said key, and
      (ii) said result is independent of said unpredictable information; and
   (e) producing a response based on said result.

29. The method of claim 28 wherein said cryptographic operation is a predefined block cipher.

30. The method of claim 29 wherein said block cipher is the Data Encryption Standard.

31. The method of claim 29 wherein all steps are implemented in a smartcard.

32. The method of claim 29 wherein individual no bit manipulated in said step (d) is measurably correlated to any bit of said key.

33. A device for performing keyed cryptographic operations, comprising:
  (a) a keyed processing unit, configured to
    (i) obtain a representation of a secret parameter encoded as a first plurality of parameters,
    (ii) receive an input datum,
    (iii) perform a cryptographic operation upon said input datum using said plurality of parameters, and
    (iv) transmit the result of said cryptographic operation; and
  (b) a key update unit, configured to
    (i) obtain said encoded representation of said secret parameter,
    (ii) obtain a blinding factor,
    (iii) produce from said first plurality of parameters and said blinding factor a second plurality of parameters where
      (1) a mathematical relationship exists between said second plurality of parameters and said first plurality of parameters; and
      (2) said second plurality of parameters is different from said first plurality of parameters.

34. The device of claim 33 where said key processing unit is further configured to derive a plurality of parameters from said secret parameter and said blinding value such that a mathematical relationship exists between said derived plurality of parameters and said obtained secret parameter, but where no measureable correlation is present between any one of said pluarlity of parameters and said secert parameter.

35. The device of claim 34 where said mathematical relationship includes addition modulo 2.

36. The device of claim 33 where said second plurality of parameters includes
  (a) A permuted part, containing a sequence of bits in permuted order; and
  (b) An ordering part, which contains the order of bits in said permuted part.

37. A method for reducing the correlation between physical attributes of a cryptographic system and the values of secret parameters being manipulated during a cryptographic operations, by masking a table lookup operation, consisting of the following steps:
  (a) receiving a representation of a lookup table for use in said table lookup operation;
  (b) receiving input and output masking parameters corresponding to said received table representation;
  (c) obtaining some unpredictable information;
  (d) deriving a transformed representation of said lookup table from said received lookup table and said unpredictable information;
  (e) deriving new input and output masking parameters corresponding to said transformed representation of said table;
  (f) storing said transformed lookup table and said input and output masking parameters in a memory; and
  (g) using said transformed table in a cryptographic computation.

38. The method of claim 37 where step (d) includes the following substeps:
  (d1) obtaining a first random value;
  (d2) generating a new output masking value from said first random value and an output masking value received at step (b);
  (d3) obtaining a second random value;
  (d4) generating a new input masking value from said second random value and an input masking value received at step (b);
  (d5) producing said transformed table with the property that the $i^{th}$ element in the transformed table is equal to the result of
    (i) finding the element at the location in the original table specified by taking an index 'i' XORed with said old input mask,
    (ii) XORing said element with the values of both said new output mask and said old output mask,
    (iii) storing said XOR result in said transformed table at a location corresponding to said index 'i' XORed with said new input mask.

39. A method for transforming data in a smartcard using the Data Encryption Standard (DES) with a secret key, comprising the steps of:
  (a) receiving a representation of a message;
  (b) combining at least a portion of said message representation with at least a portion of a representation of said key to produce a DES intermediate representation;
  (c) producing from said DES intermediate an index to a substitution (S) operation, where said index is a representation of a traditional 6-bit S table input;
  (d) performing an S operation, producing an S result in an expanded representation for which the Hamming Weight of said S result is independent of the value of said S table input;
  (e) combining the result of said S operation with said DES intermediate to produce a new DES intermediate representation;
  (f) repeating steps (c) through (e) a plurality of times; and
  (g) converting the final DES intermediate representation into a DES result, where said DES result is a representation of the result of applying the DES standard to said message with said secret key.

* * * * *

UNITED STATES PATENT AND TRADEMARK OFFICE
CERTIFICATE OF CORRECTION

PATENT NO. : 6,278,783 B1      Page 1 of 1
DATED : August 21, 2001
INVENTOR(S) : Kocher et al.

It is certified that error appears in the above-identified patent and that said Letters Patent is hereby corrected as shown below:

<u>Title page,</u>
Delete the comma following "CRYPTOGRAPHIC."

<u>Claim 20,</u>
Line 2, delete "shuffle" and insert -- reshuffle -- therefor --.

<u>Claim 34,</u>
Line 7, delete "pluarlity" and insert -- plurality -- therefor.
Line 7, delete "secert" and insert -- secret -- therefor.

Signed and Sealed this

Twenty-sixth Day of February, 2002

Attest:

JAMES E. ROGAN
*Attesting Officer*     *Director of the United States Patent and Trademark Office*